United States Patent
Kim et al.

(10) Patent No.: US 11,326,520 B2
(45) Date of Patent: May 10, 2022

(54) HEAT EXCHANGE APPARATUS AND GAS TURBINE HAVING THE SAME

(71) Applicant: DOOSAN HEAVY INDUSTRIES & CONSTRUCTION CO., LTD., Changwon-si (KR)

(72) Inventors: Jaecheol Kim, Busan (KR); Jeongkil Kim, Usan (KR); Kihoon Yang, Yongin-si (KR)

( * ) Notice: Subject to any disclaimer, the term of this patent is extended or adjusted under 35 U.S.C. 154(b) by 193 days.

(21) Appl. No.: 16/876,051

(22) Filed: May 16, 2020

(65) Prior Publication Data

US 2020/0386163 A1 Dec. 10, 2020

(30) Foreign Application Priority Data

Jun. 4, 2019 (KR) .......................... 10-2019-0065970

(51) Int. Cl.
*F02C 7/18* (2006.01)
*F28F 3/02* (2006.01)

(52) U.S. Cl.
CPC .............. *F02C 7/185* (2013.01); *F28F 3/025* (2013.01)

(58) Field of Classification Search
CPC .... F02C 7/185; F02C 7/12; F02C 7/16; F02C 7/18; F28F 3/025
See application file for complete search history.

(56) References Cited

U.S. PATENT DOCUMENTS

| | | | |
|---|---|---|---|
| 5,137,558 A * | 8/1992 | Agrawal | F17C 9/04 62/612 |
| 6,412,285 B1 | 7/2002 | Ranasinghe et al. | |
| 6,532,744 B1 * | 3/2003 | Reiter | F02C 7/185 60/39.83 |
| 7,191,824 B2 * | 3/2007 | Wu | F28F 13/12 165/161 |
| 7,972,198 B2 * | 7/2011 | Noishiki | B24C 1/04 451/29 |
| 8,627,882 B2 * | 1/2014 | Schmidt | F28D 7/0066 165/76 |
| 8,944,155 B2 * | 2/2015 | Martin | F28F 1/426 165/169 |

(Continued)

FOREIGN PATENT DOCUMENTS

JP 2000283668 A * 10/2000 .............. F25B 15/02
JP 2001-296090 A 10/2001
(Continued)

*Primary Examiner* — Craig Kim
(74) *Attorney, Agent, or Firm* — Harvest IP Law, LLP

(57) ABSTRACT

A heat exchange apparatus cools air supplied from a compressor to a turbine and includes a shell housing; a heat exchanger coupled to an outer surface of the shell housing and configured to cool air passing through an air channel of the heat exchanger using a coolant passing through a coolant channel; a flow guide installed in the shell housing and connected to the air channel of the heat exchanger in order to pass the cooled air into the shell housing, the flow guide having a distal end spaced apart from an inner surface of the shell housing; and at least one air discharge port installed through a sidewall of the shell housing to communicate with the air channel via the flow guide. The heat exchanger is a printed board type including a first plate and a second plate and is formed by alternately stacking the first and second plates.

19 Claims, 15 Drawing Sheets

(56) References Cited

U.S. PATENT DOCUMENTS

| | | | | |
|---|---|---|---|---|
| 9,828,275 | B2* | 11/2017 | Kang | F28F 27/00 |
| 9,951,995 | B2* | 4/2018 | Stewart | F28D 1/0233 |
| 2007/0125527 | A1* | 6/2007 | Flik | F28D 7/1692 |
| | | | | 165/140 |
| 2007/0176499 | A1* | 8/2007 | Holmes | H02K 3/24 |
| | | | | 310/58 |
| 2007/0234567 | A1* | 10/2007 | Noishiki | B24C 1/04 |
| | | | | 29/423 |
| 2010/0071878 | A1* | 3/2010 | Gilchrist, III | F02C 3/34 |
| | | | | 165/104.19 |
| 2013/0160458 | A1* | 6/2013 | Willmot | H02G 3/02 |
| | | | | 60/801 |
| 2013/0192806 | A1* | 8/2013 | Noishiki | F04D 29/5826 |
| | | | | 165/166 |
| 2015/0155060 | A1* | 6/2015 | Yetisir | G21C 1/08 |
| | | | | 376/361 |
| 2016/0097596 | A1* | 4/2016 | Stewart | F28F 1/045 |
| | | | | 165/175 |
| 2016/0341497 | A1* | 11/2016 | Kitaguchi | F28F 13/06 |
| 2017/0108277 | A1* | 4/2017 | Platell | B60K 11/02 |
| 2017/0362988 | A1* | 12/2017 | Matsuura | F28D 9/0031 |
| 2019/0218971 | A1* | 7/2019 | Niergarth | F02C 7/185 |
| 2020/0332715 | A1* | 10/2020 | Ribarov | F02C 7/14 |
| 2020/0355121 | A1* | 11/2020 | O'Meallie | F02C 7/36 |
| 2020/0386119 | A1* | 12/2020 | Roberge | F02C 9/18 |
| 2021/0396179 | A1* | 12/2021 | Balandier | F02C 7/12 |

FOREIGN PATENT DOCUMENTS

| | | |
|---|---|---|
| KR | 10-2013-0088803 A | 8/2013 |
| KR | 10-2014-0139603 A | 12/2014 |

* cited by examiner

HEAT EXCHANGE APPARATUS AND GAS TURBINE HAVING THE SAME

CROSS-REFERENCE TO RELATED APPLICATION

This application claims priority to Korean Patent Application No. 10-2019-0065970 filed on Jun. 4, 2019, the disclosure of which is incorporated by reference herein in its entirety.

BACKGROUND

Field

Exemplary embodiments relate to a heat exchange apparatus and a gas turbine having the same.

Description of the Related Art

Turbines are machines that obtain a rotational force by impingement or reaction force using the flow of a compressible fluid such as steam or gas, and include a steam turbine using steam, a gas turbine using hot combustion gas, and so on.

Among them, the gas turbine largely includes a compressor, a combustor, and turbine. The compressor has an air inlet for introduction of air, and includes a plurality of compressor vanes and compressor blades alternately arranged in a compressor housing.

The combustor supplies fuel to the air compressed by the compressor, mixes the result, and ignites the mixture with a burner to produce high-temperature and high-pressure combustion gas.

The turbine includes a plurality of turbine vanes and turbine blades alternately arranged in a turbine housing. In addition, a rotor is disposed to pass through the centers of the compressor, the combustor, the turbine, and an exhaust chamber.

The rotor is rotatably supported at both ends by bearings. The rotor has a plurality of disks fixed to the rotor, and blades are connected to each of the disks while a drive shaft of, e.g., a generator, is connected to the end of the exhaust chamber.

The gas turbine is advantageous in that consumption of lubricant is extremely low due to the absence of mutual friction parts such as a piston-cylinder since it does not have a reciprocating mechanism such as a piston in a four-stroke engine, the amplitude, which is a characteristic of reciprocating machines, is greatly reduced, and it enables high-speed motion.

The operation of the gas turbine is briefly described. The air compressed by the compressor is mixed with fuel so that the mixture is burned to produce hot combustion gas, and the produced combustion gas is injected into the turbine. The injected combustion gas generates a rotational force while passing through the turbine vanes and turbine blades, thereby rotating the rotor.

SUMMARY

Aspects of one or more exemplary embodiments provide a heat exchange apparatus that includes a printed-board-type heat exchanger, configured to cool air supplied from a compressor to a turbine, on an outer surface of a shell housing, and a gas turbine having the same.

Additional aspects will be set forth in part in the description which follows and, in part, will become apparent from the description, or may be learned by practice of the exemplary embodiments.

According to an aspect of an exemplary embodiment, there is provided a heat exchange apparatus including a shell housing; a heat exchanger coupled to an outer surface of the shell housing and configured to cool air passing through an air channel of the heat exchanger using a coolant passing through a coolant channel; a flow guide installed in the shell housing and connected to the air channel of the heat exchanger in order to pass the cooled air into the shell housing, the flow guide having a distal end spaced apart from an inner surface of the shell housing; and at least one air discharge port installed through a sidewall of the shell housing and configured to communicate with the air channel via the flow guide.

The heat exchanger may include a first plate and a second plate and is formed by alternately stacking the first and second plates. The first plate may include a printed board having a plurality of first channels each of which has an open side facing in a plate orientation direction, the plurality of first channels spaced apart from each other in a first direction; and the second plate may include a printed board having a plurality of second channels each of which has an open side facing in the plate orientation direction, the plurality of second channels spaced apart from each other in a second direction.

The plurality of first channels of the first plate may extend in the second direction between an inlet of the plurality of first channels and an outlet of the plurality of first channels. Each of the inlet and the outlet of the plurality of first channels may communicate with the coolant channel of the heat exchanger via a channel converging portion of the plurality of first channels. The channel converging portion may be formed on opposite ends of the first plate, respectively.

The plurality of second channels of the second plate may extend in the first direction between an inlet of each of the plurality of second channels and an outlet of each of the plurality of second channels. Each of the second channel inlets and the second channel outlets may communicate with the air channel of the heat exchanger via a printed board edge portion of the plurality of second channels. The printed board edge portion may be formed on opposite ends of the second plate, respectively.

The first and second directions may be perpendicular to each other.

The plurality of first channels of the first plate may be parallel to each other, and the plurality of second channels of the second plate may be parallel to each other.

Each of the plurality of first channels and the plurality of second channels of at least one of the first and second plates may include a zigzag portion.

The plurality of first channels of the first plate may follow a serpentine path between an inlet of the first channels and an outlet of the first channels. Each of the plurality of first channels of the first plate may include a parallel portion in which one or more of the first channels are disposed in parallel to the plurality of second channels of the second plate.

Each of the plurality of first channels and the plurality of second channels of at least one of the first and second plate may include a diamond-shaped mesh portion.

The shell housing may have a longitudinal center perpendicular to a center of the flow guide.

The distal end of the flow guide may be disposed at a predetermined height from the inner surface of the shell housing. The at least one air discharge port may be installed in the sidewall of the shell housing at a position higher than the predetermined height.

The heat exchange apparatus may further include a pair of screens respectively positioned at a predetermined distance from the sidewall in which the at least one air discharge port is installed. Each of the pair of screens may have a lower end coupled to an inner surface of the shell housing. The at least one air discharge port includes a pair of air discharge ports installed respectively through opposite sidewalls of the shell housing, and each of the pair of air disparage ports may be disposed behind a corresponding screen of the pair of screens. The shell housing may consist of two or more shell housings connected to each other, each of the shell housings configured to house the heat exchanger, the flow guide, the at least one discharge port, and the pair of screens.

According to an aspect of another exemplary embodiment, there is provided a heat exchange apparatus including a plurality of shell housings each having an outer surface and a longitudinal axis, the plurality of shell housings connected to each other along the longitudinal axis; a heat exchanger coupled to the outer surface of each shell housings and configured to cool air passing through an air channel of the heat exchanger using a coolant passing through a coolant channel; a flow guide installed in each shell housing and connected to the air channel of the heat exchanger in order to pass the cooled air into a corresponding shell housing of the plurality of shell housings, the flow guide having a distal end spaced apart from an inner surface of each shell housing; and at least one air discharge port installed through a sidewall of each shell housing and configured to communicate with the air channel via the flow guide.

According to an aspect of the above exemplary embodiments, there is provided a gas turbine including a compressor configured to compress air; a combustor configured to produce combustion gas by mixing fuel with the compressed air and burning the mixture; a turbine configured to generate power by rotating plurality of turbine blades using the combustion gas; and a heat exchange apparatus configured to cool air supplied from the compressor to the turbine. The heat exchange apparatus of the gas turbine is consistent with the above-described heat exchange apparatuses. The gas turbine may further include a first cooling air line configured to guide cooling air from a first pressure stage of the compressor to a low-pressure section of the turbine; and a second cooling air line configured to guide cooling air from a second pressure stage under higher pressure than the first pressure stage of the compressor to a section of the turbine under higher pressure than the low-pressure section. Here, the heat exchange apparatus may be disposed between the first and second cooling air lines.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
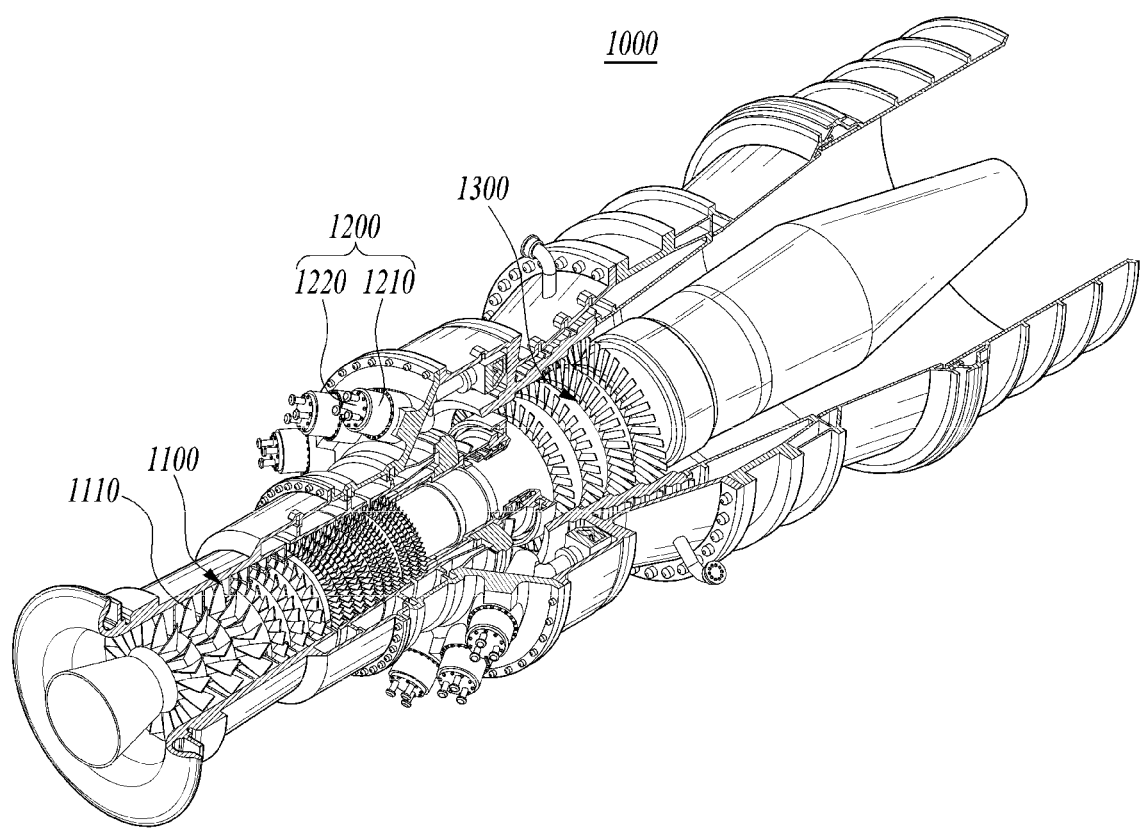
FIG. 1 is a cutaway perspective view of a gas turbine to which may be applied a heat exchange apparatus of the present disclosure.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 2:
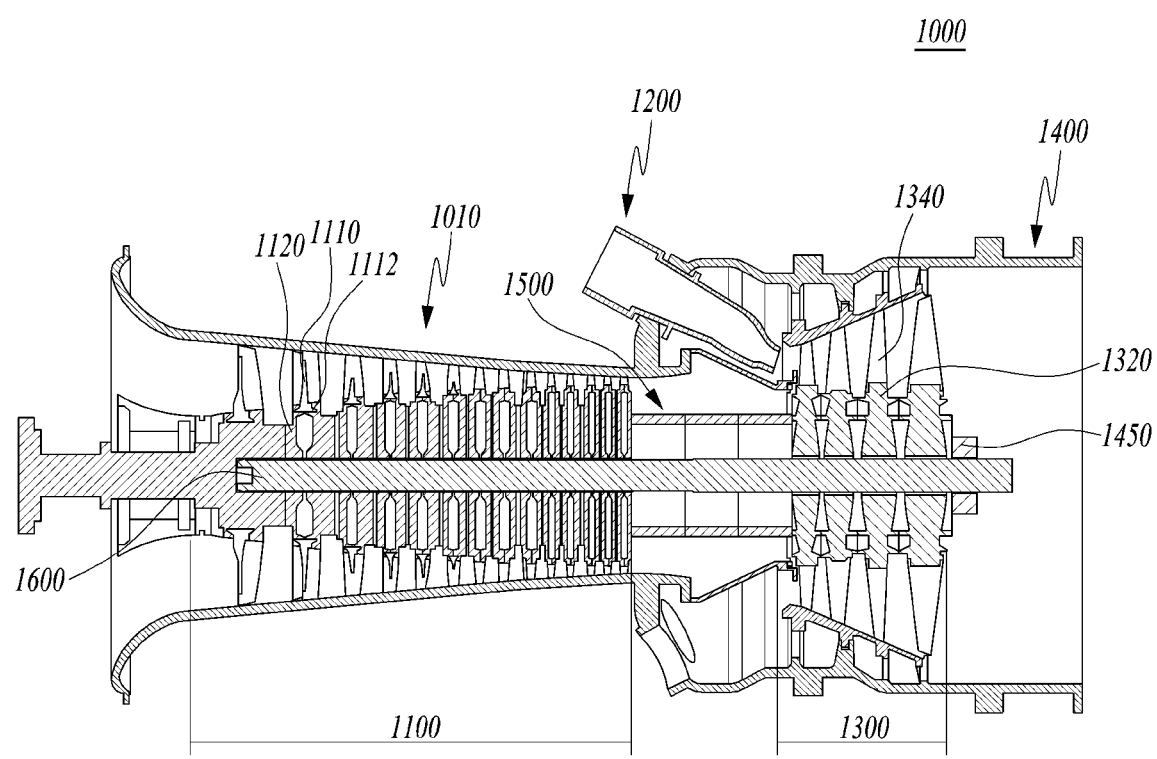
FIG. 2 is a cross-sectional view of the gas turbine of FIG. 1.
Figure 3:
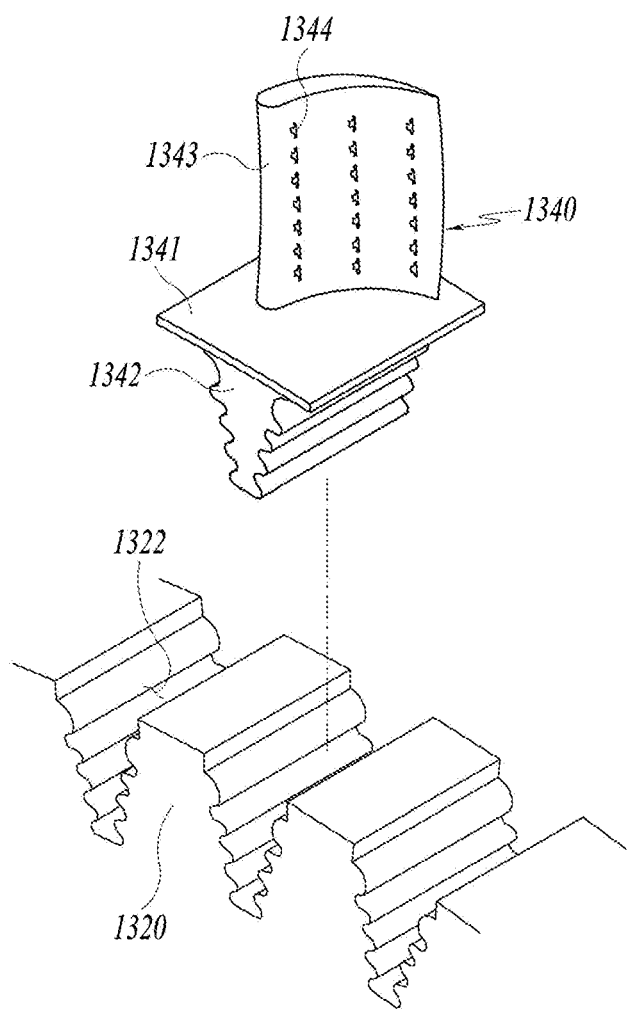
FIG. 3 is an exploded perspective view of a peripheral portion of a turbine rotor disk of FIG. 2.

FIGS. 1-3 illustrate a gas turbine to which may be applied a heat exchange apparatus of the present disclosure.

Referring to FIG. 1, a gas turbine 1000 includes a compressor 1100, a combustor 1200, and a turbine 1300. The compressor 1100 includes a plurality of blades 1110 arranged radially. The compressor 1100 rotates the blades 1110, so that air is compressed and flows by the rotation of the blades 1110. The sizes and installation angles of the blades 1110 may vary depending on the installation positions of the blades 1110. In an exemplary embodiment, the compressor 1100 may be directly or indirectly connected to the turbine 1300, to receive some of the power generated by the turbine 1300 and use the received power to rotate the blades 1110.

The air compressed by the compressor 1100 flows to the combustor 1200. The combustor 1200 includes a plurality of combustion chambers 1210 and fuel nozzle modules 1220 arranged annularly.

Referring to FIG. 2, the gas turbine 1000 includes a housing 1010 and a diffuser 1400 disposed behind the housing 1010 to discharge the combustion gas having passed through the turbine. The combustor 1200 is disposed in front of the diffuser 1400 and is supplied with the compressed air for combustion.

On the basis of the direction of air flow, the compressor 1100 is disposed in an upstream portion of the housing 1010, and the turbine 1300 is disposed in a downstream portion of the housing 1010. Between the compressor 1100 and the turbine 1300, a torque tube 1500 is disposed as a torque transmission member for transmitting the rotational torque, generated in the turbine 1300, to the compressor 1100.

The compressor 1100 includes a plurality (e.g., fourteen) of compressor rotor disks 1120 individually fastened by a tie rod 1600 so as not to be axially separated from each other.

Specifically, the compressor rotor disks 1120 are axially aligned in the state in which the tie rod 1600 forming a rotary shaft passes through the substantial centers of the individual compressor rotor disks 1120. Here, the compressor rotor disks 1120 are arranged so as not to be rotatable relative to each other in such a manner that the facing surfaces of adjacent individual compressor rotor disks 1120 are pressed by the tie rod 1600.

Each of the compressor rotor disks 1120 has an outer peripheral surface to which is radially coupled a plurality of blades 1110. Each of the blades 1110 has a dovetail 1112 fastened to the compressor rotor disk 1120.

Vanes (not illustrated) are fixedly arranged, between the individual compressor rotor disks 1120, in the housing. The vanes are fixed so as not to rotate, unlike the compressor rotor disks, and serve to align a flow of compressed air having passed through the blades of a compressor rotor disk to guide the aligned flow of air to the blades of a compressor rotor disk positioned downstream.

The dovetail 1112 may be fastened in a tangential type or axial type, which may be selected according to the structure required for the gas turbine used. This type may have a commonly known dovetail or fir-tree shape. In some cases, the blades may be fastened to the compressor rotor disk using a fastener, for example a fixture such as a key or a bolt, other than the above fastening type.

The tie rod 1600 is disposed to pass through the centers of the plurality of compressor rotor disks 1120 and turbine rotor disks 1320. The tie rod 1600 may be a single tie rod or consist of a plurality of tie rods. One end of the tie rod 1600 is fastened to a most upstream compressor rotor disk, and the other end is fastened by a fixing nut 1450.

The tie rod 1600 may have various shapes depending on the structure of the gas turbine, and is therefore not necessarily limited to that illustrated in FIG. 2. That is, as illustrated in the drawings, one tie rod may be disposed to pass through the centers of the rotor disks, a plurality of tie rods may be arranged circumferentially, or a combination thereof may be used.

Although not illustrated in the drawings, in order to increase the pressure of a fluid in the compressor of the gas turbine and then adjust the angle of flow of the fluid, entering into the inlet of the combustor, to a design angle of flow, a vane serving as a guide vane may be installed at the next position of the diffuser, which is referred to as a deswirler.

The combustor 1200 mixes fuel with the compressed air introduced and burns the mixture to produce high-temperature and high-pressure combustion gas with high energy. The combustor 1200 increases the temperature of the combustion gas to a heat-resistant limit of combustor and turbine components through an isobaric combustion process.

The combustion system of the gas turbine may include a plurality of combustors arranged in the housing in the form of a shell. Each of the combustors may include a burner having a fuel injection nozzle and the like, a combustor liner defining a combustion chamber, and a transition piece serving as the connection between the combustor and the turbine.

Specifically, the liner provides a combustion space in which, for combustion, the fuel injected by the fuel injection nozzle is mixed with the compressed air from the compressor. The liner may include a flame container providing the combustion space in which the mixture of air and fuel is burned, and a flow sleeve defining an annular space while surrounding the flame container. The fuel injection nozzle is coupled to the front end of the liner, and an ignition plug is coupled to the side wall of the liner.

The transition piece is connected to the rear end of the liner to transfer the combustion gas, burned by the ignition plug, toward the turbine. The outer wall of the transition piece is cooled by the compressed air supplied from the compressor to prevent the transition piece from being damaged due to the high temperature of the combustion gas.

To this end, the transition piece has holes for cooling formed to inject air the transition piece, and the compressed air cools the body in the transition piece through the holes and then flows toward the liner.

The cooling air used to cool the transition piece may flow in the annular space of the liner, and the compressed air may impinge on the cooling air supplied through cooling holes, formed in the flow sleeve, from the outside of the flow sleeve on the outer wall of the liner.

The high-temperature and high-pressure combustion gas coming out of the combustor is supplied to the turbine 1300. The supplied high-temperature and high-pressure combustion gas impinges on the blades of the turbine and applies a reaction force to the turbine while expanding, resulting in rotational torque. The obtained rotational torque is transmitted via the torque tube to the compressor, and power exceeding the power required to drive the compressor is used to drive a generator 1700 (see FIG. 4) or the like.

The turbine 1300 basically has a structure similar to the compressor. That is, the turbine 1300 also includes a plurality of turbine rotor disks 1320 similar to the compressor rotor disks of the compressor. Accordingly, each of the turbine rotor disks 1320 also includes a plurality of turbine blades 1340 arranged radially. The turbine blades 1340 may also be coupled to the turbine rotor disk 1320 in a dovetail manner or the like. In addition, individual turbine vanes (not illustrated) fixed in the housing are provided between the blades 1340 of a turbine rotor disk 1320 and the blades 1340 of an adjacent turbine rotor disk 1320, to guide the direction of flow of the combustion gas having passed through the blades.

Referring to FIG. 3, each of the turbine rotor disks 1320 has a substantially disk shape and an outer peripheral portion in which are formed a plurality of coupling slots 1322. Each of the coupling slots 1322 has a curved surface in a fir-tree form.

Each of the turbine blades 1340 is fastened to an associated one of the coupling slots 1322. In FIG. 3, the turbine blade 1340 includes a flat platform part 1341 formed at the substantial center of the turbine blade. The side of the platform part 1341 is in contact with the side of the platform part 1341 of an adjacent turbine blade, which serves to maintain the distance between the blades.

A root part 1342 is formed on the back of the platform part 1341. The root part 1342 has an axial-type structure in which it is inserted into the coupling slot 1322 of the turbine rotor disk 1320 in the axial direction of the turbine rotor disk 1320.

The root part 1342 has a curved portion in a substantially fir-tree form, which corresponds to the curved portion formed in the coupling slot. Here, the root part does not necessarily have a coupling structure in the fir-tree form, and may also have a dovetail form.

A blade part 1343 is formed on the upper surface of the platform part 1341. The blade part 1343 may be formed to have an optimized airfoil shape according to the specification of the gas turbine. On the basis of the direction of flow of combustion gas, the blade part 1343 has a leading edge disposed upstream and a trailing edge disposed downstream.

Unlike the blades of the compressor, the blades of the turbine come into direct contact with high-temperature and high-pressure combustion gas. Since the temperature of the combustion gas is as high as 1700° C., the turbine requires a cooling device. To this end, the turbine has a cooling channel through which the compressed air is bled from some points of the compressor to be supplied to the blades of the turbine.

The cooling channel may extend from the outside of the housing (external channel), may extend through the inside of the rotor disk (internal channel), or both of the external channel and the internal channel may be used. In FIG. 3, the blade part has a surface in which a plurality of film cooling holes 1344 are formed, and the film cooling holes 1344 serve to communicate with a cooling channel (not illustrated) defined in the blade part 1343 so that the cooling air is supplied to the surface of the blade part 1343.

Figure 4:
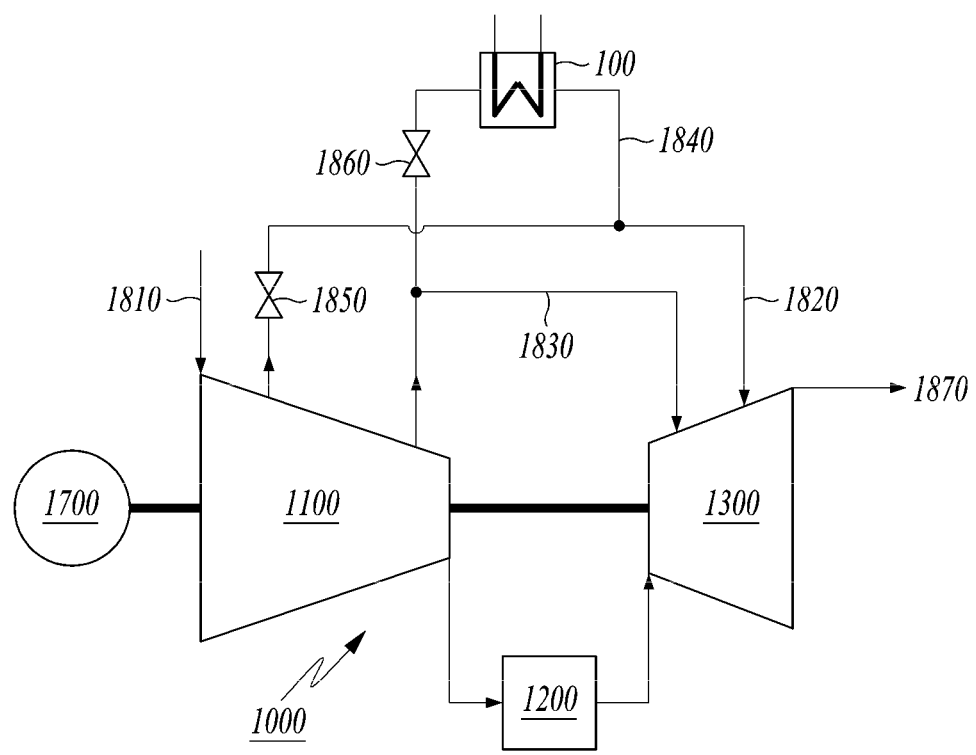
FIG. 4 is a schematic diagram illustrating a flow of air in the gas turbine of FIGS. 1 and 1.

FIG. 4 illustrates a flow of air in the gas turbine 1000.

Referring to FIG. 4, the gas turbine 1000 includes the compressor 1100 and the turbine 1300 that are connected to each other by the rotary shaft (heavy line), which is connected to the generator 1700 to generate electric power. According to the exemplary embodiment, the gas turbine 1000 further includes a cooling air system with two pressure stages, which are generated from ambient air 1810 that is drawn in and compressed by the compressor 1100. The two pressure stages of the cooling air system are formed by a first cooling air line 1820 and a second cooling air line 1830.

The first cooling air line 1820 guides cooling air from the first pressure stage of the compressor 1100 to the turbine 1300 so that the cooling air is used to cool thermally loaded components in the low-pressure section of the turbine 1300. The second cooling air line 1830 guides cooling air from the second pressure stage (which is under higher pressure than the first pressure stage) of the compressor 1100 to the turbine 1300 so that the cooling air is used to cool thermally loaded components in the high-pressure and/or medium-pressure section of the turbine 1300.

In order to control the supply of the cooling air through the first cooling air line 1820, a first control valve 1850 may be provided near the compressor 1100 in the first cooling air line 1820. The first control valve 1850 may control a mass flow rate of cooling air supplied through the first cooling air line 1820.

Between the first cooling air line 1820 and the second cooling air line 1830, a connection line 1840 may be disposed. In the connection line 1840, a heat exchange apparatus 100 and a second control valve 1860 are installed for a flow of auxiliary cooling air. When the second control valve 1860 is opened, the auxiliary cooling air may flow from the second cooling air line 1830 through the connection line 1840 and the heat exchange apparatus 100 into the first cooling air line 1820.

When low-pressure cooling is sufficiently realized by the auxiliary cooling air through the connection line 1840, the first control valve 1850 is completely closed, in which case the cooling air may be supplied only through the connection line 1840 to the first cooling air line 1820.

The combustion gas used to rotate the turbine 1300 becomes exhaust gas 1870, which is discharged to the outside or introduced into an exhaust gas treatment system for processing.

Figure 5:
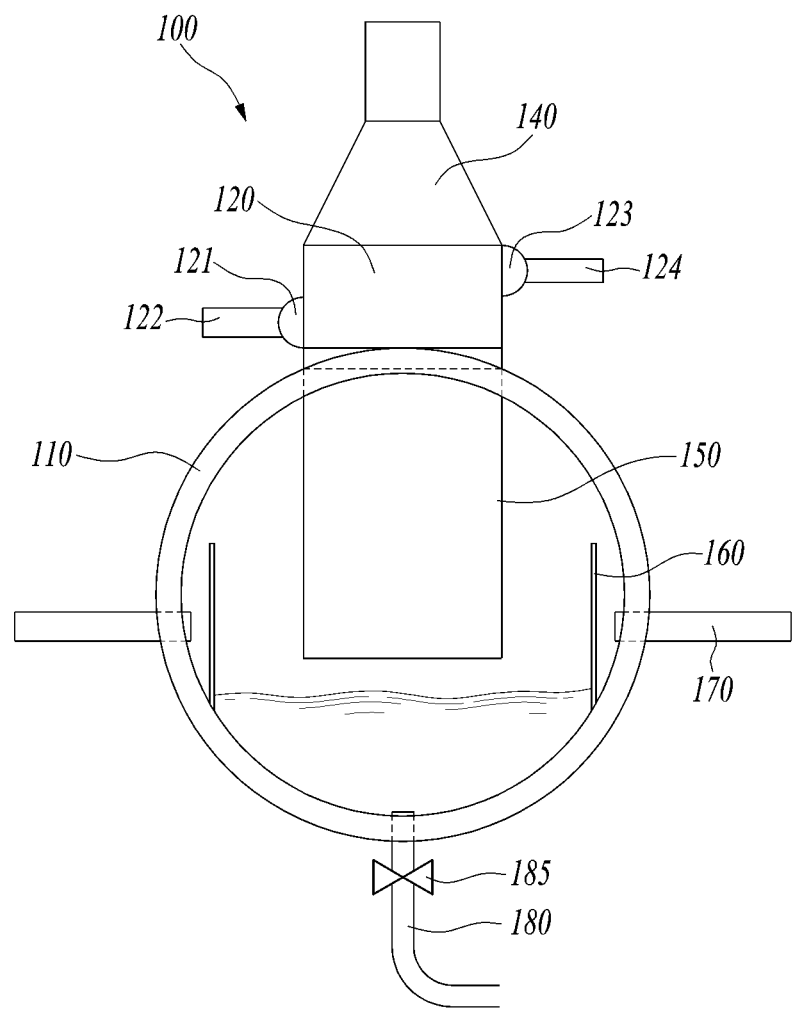
FIG. 5 is a longitudinal sectional view illustrating a heat exchange apparatus according to an exemplary embodiment.
Figure 6:
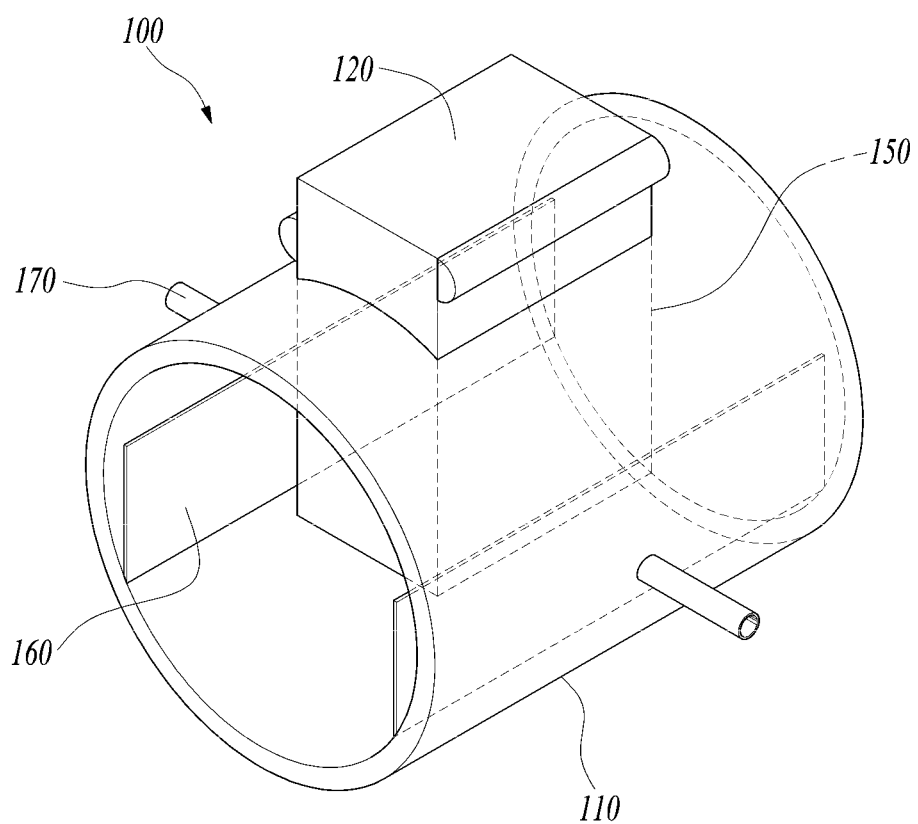
FIG. 6 is a perspective view of the heat exchange apparatus of FIG. 5.

FIGS. 5 and 6 illustrate the heat exchange apparatus 100 according to the exemplary embodiment. The heat exchange apparatus 100 includes a shell housing 110, a heat exchanger 120 of a printed board type, a flow guide 150, and at least one air discharge port 170.

Referring to FIGS. 5 and 6, the shell housing 110 has a longitudinal center that is perpendicular to a vertically disposed center of the flow guide 150, such that the shell housing 110 resides in a generally horizontal position. The heat exchanger 120 is coupled to the upper outer surface of the shell housing 110 and is configured to cool air passing through a vertically disposed air channel of the heat exchanger 120 using a horizontally disposed coolant passing through a coolant channel. That is, the heat exchanger 120 is disposed on the outer surface of the shell housing 110 and includes a vertical air channel and a horizontal coolant channel. The flow guide 150 is installed in the shell housing 110 and is connected to the air channel of the heat exchanger 120 and has a lower end spaced apart from the inner surface of the shell housing 110 by a predetermined height. The at least one air discharge port 170 may include a pair of air discharge ports 170 respectively installed through opposite sidewalls of the shell housing 110.

The shell housing 110 may have a cylindrical shape having a cross section cut through its longitudinal axis. The cross section of the shell housing is shown in FIGS. 5 and 6 as circular, but it may be rectangular, square, or circular.

The heat exchanger 120 being a printed-board-type heat exchanger is made by stacking and bonding plates having micro-channels. Thus, the size of the heat exchanger 120 may be smaller than a fin-tube-type heat exchanger. The small size of the heat exchanger 120 enables its coupling to the outer surface of the shell housing 110. In particular, the heat exchanger 120 may be coupled to a square opening formed on the upper surface of the shell housing 110 by welding or may be fastened to the shell housing 110 by bolts and nuts through a bracket provided at the lower end of the heat exchanger 120.

The heat exchanger 120 may have an inlet header 121 coupled to one side, and the inlet header 121 may be connected to a coolant inlet pipe 122. The heat exchanger 120 may have an outlet header 123 coupled to the other side, and the outlet header 123 may be connected to a coolant outlet pipe 124. Here, the coolant inlet and outlet pipes 122 and 124 correspond to the pair of ports shown in FIG. 4 at the top of the heat exchange apparatus 100.

On the heat exchanger 120, an air introduction duct 140 may be connected to guide air to flow into the heat exchanger 120. The air introduction duct 140 is connected to the heat exchanger 120 so that some of the air compressed by the compressor 1100 passes through the heat exchanger 120. The air introduction duct 140 communicates with the connection line 1840 and corresponds to one side of the heat exchange apparatus 100 as shown in FIG. 4. Meanwhile, the at least one air discharge port 170 of FIGS. 5 and 6 communicates with the connection line 1840 and corresponds to the other side of the heat exchange apparatus 100 as shown in FIG. 4.

The flow guide 150 may be connected to the lower portion of the heat exchanger 120 and have a rectangular pipe shape like the heat exchanger 120. That is, the flow guide 150 may be a rectangular parallelepiped casing with upper and lower surfaces open. The lower end of the flow guide 150 may be spaced apart from the internal bottom of the shell housing 110 by a predetermined height to prevent the flow guide 150 from submerging in the condensate collected on the bottom of the shell housing 110.

The air discharge ports 170 are installed at a predetermined height through both sidewalls of the shell housing 110. More specifically, the at least one air discharge port 170 may be installed through a sidewall of the shell housing 110 and may be configured to communicate with the air channel via the flow guide 150. The air discharge ports 170 may be disposed at a position higher than the lower end of the flow guide 150.

The air discharge ports 170 are connected to the turbine 1300 to supply the turbine 1300 with the air cooled by the heat exchange apparatus 100.

The heat exchange apparatus 100 may include a pair of screen members 160, the lower ends of which are respectively coupled to opposite sides within the shell housing 110, and which are positioned at a predetermined distance from both sidewalls of the shell housing 110, namely, a predetermined distance from the sidewall in which the at least one air discharge port 170 is installed, and each of the pair of screens member 160 has a lower end coupled to an inner surface of the shell housing 110. The screen members 160 may each be a rectangular plate spaced apart from the air discharge port 170 by a predetermined distance such that the air discharge port 170 is behind a corresponding screen member 160.

The shell housing 110 is sealed with circular cover plates coupled to its front and rear surfaces, and the cover plates may also be coupled to the front and rear ends of the screen members 160.

The heat exchanger 120 comprises a plurality of first plates 130 and a plurality of second plates 135.

Meanwhile, first through fourth examples of the exemplary embodiment of the first and second plates 130 and 135 are shown in FIGS. 7A and 7B, FIGS. 8A and 8B, FIGS. 9A and 9B, and FIGS. 10A and 10B, respectively. In each example, the heat exchanger 120 comprises a first plate 130 and a second plate 135 and is formed by alternately stacking the first and second plates 130 and 135. The first plate 130 of the heat exchanger 120 includes a printed board having a plurality of first channels 132 each of which has an open side facing in one direction, and the second plate 135 of the heat exchanger 120 includes a printed board having a plurality of second channels 137 each of which has an open side facing in the one direction. In other words, the plurality of printed boards (130, 135) all face in the same direction, namely, a plate orientation direction. The plurality of first channels 132 of each of the plurality of first plates 130 are arranged adjacent to each other on an upper surface of each first plate 130, and the plurality of second channels 137 of each of the plurality of second plates 135 are arranged adjacent to each other on an upper surface of each second plate 135. By being so arranged adjacent to each other, the plurality of first channels 132 are spaced apart from each other in a first direction across the printed board, and the plurality of second channels 137 are spaced apart from each other in a second direction across the printed board. The first and second directions are perpendicular to each other.

The first and second channels 132 and 137 formed on the respective first and second plates 130 and 135 may be formed by etching. The first and second plates 130 and 135 each having the channels may be alternately stacked and then diffusion-bonded by pressing.

Figure 7A:
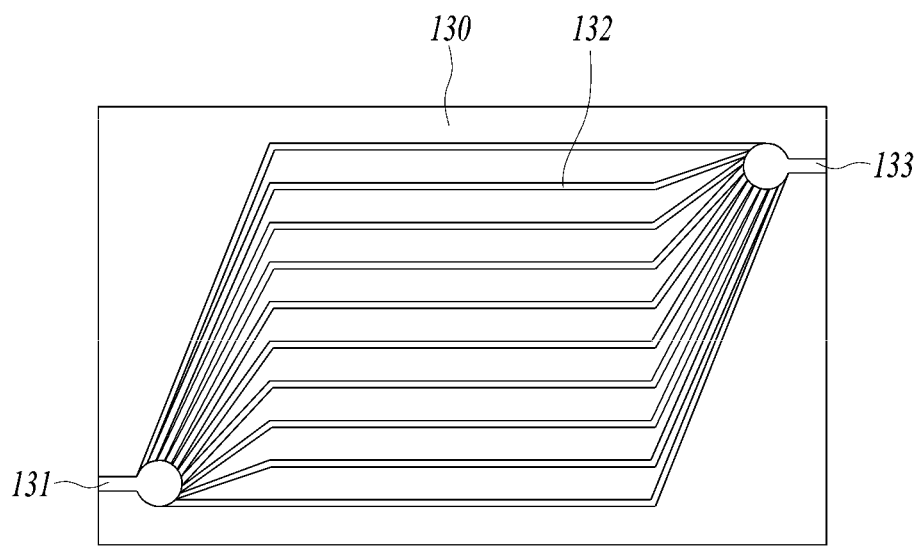
FIGS. 7A and 7B are top views of first and second plates, respectively, formed according to a first example of the exemplary embodiment.

As illustrated in FIG. 7A, the first channels 132 may be formed horizontally as a whole on the upper surface of the first plate 130, and the first plate 130 may have an inlet 131 and an outlet 133 formed respectively at opposite ends of the first channels 132 that converge on the inlet 131 and the outlet 133. When the first and second plates 130 and 135 are stacked within the hear exchanger 120, the inlets 131 of each first plate 130 are aligned so as to be juxtaposed to the inlet header 121 and the outlets 133 are aligned so as to be juxtaposed to the outlet header 123 (see FIGS. 5 and 6).

Figure 7B:
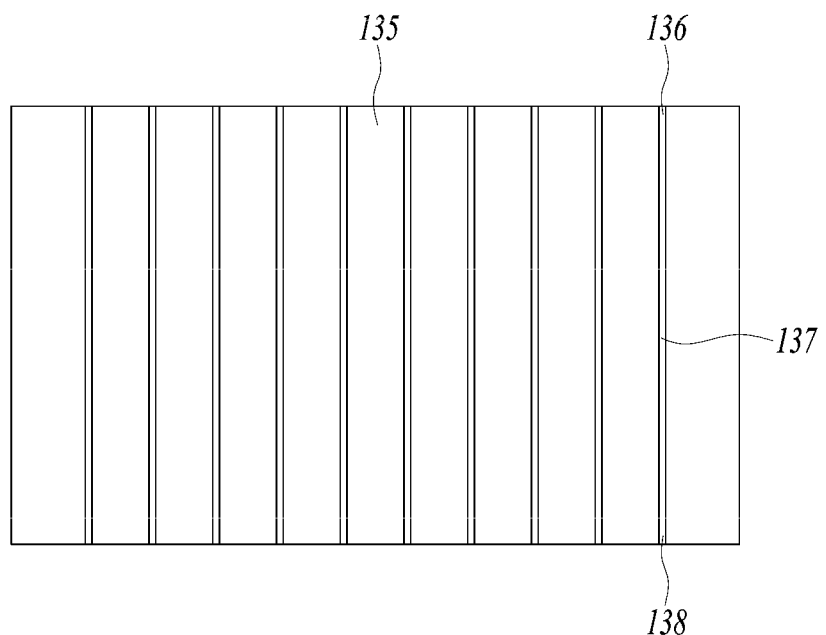

As illustrated in FIG. 7B, the second channels 137 may be formed vertically in parallel on the upper surface of the second plate 135. Each of the second channels 137 may have an inlet 136 and an outlet 138 formed respectively at opposite ends of the second channels 137. Unlike the first channels 132, the inlets 136 and outlets 138 of the second channels 137 may be formed independently without convergence of the channels. That is, each of the inlets and outlets 136 and 138 of the second channels 137 communicates with the air channel of the heat exchanger 120 via a printed board edge portion of the plurality of second channels 137, the printed board edge portion respectively formed on opposite ends of the second plate 135.

Referring to FIGS. 7A and 7B, in the first example of the exemplary embodiment, the first and second channels 132 and 137 of the respective first and second plates 130 and 135 may be arranged largely perpendicular to each other. The plurality of first channels 132 of the first plate 130 may be parallel to each other, and the plurality of second channels 137 of the second plate 135 may similarly be parallel to each other. At least one end of each of the first channels 132 may be bent and inclined toward the inlet 131 or the outlet 133. Air may be cooled by exchanging heat with coolant while the coolant flows through the first channels 132 of the first plate 130 and the air flows through the second channels 137 of the second plate 135.

Figure 8A:
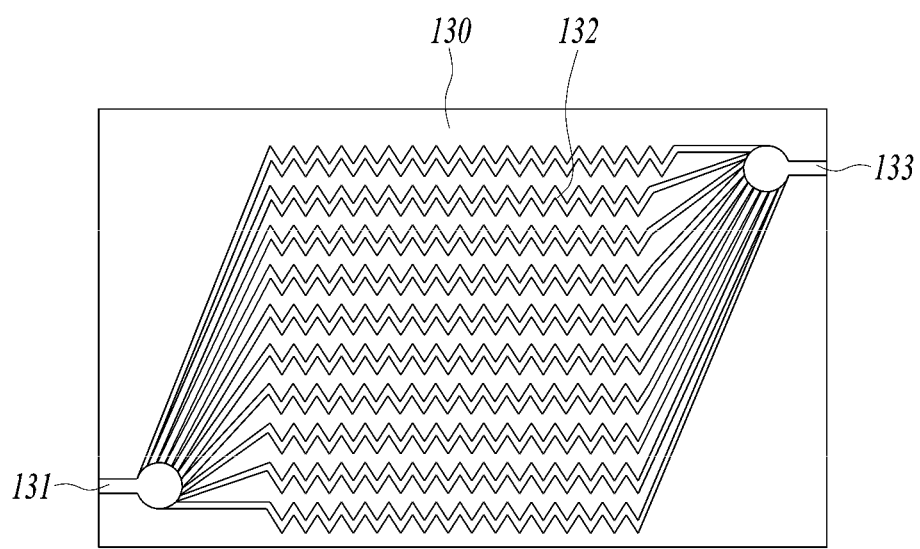
FIGS. 8A and 8B are top views of first and second plates, respectively, formed according to a second example of the exemplary embodiment.
Figure 8B:
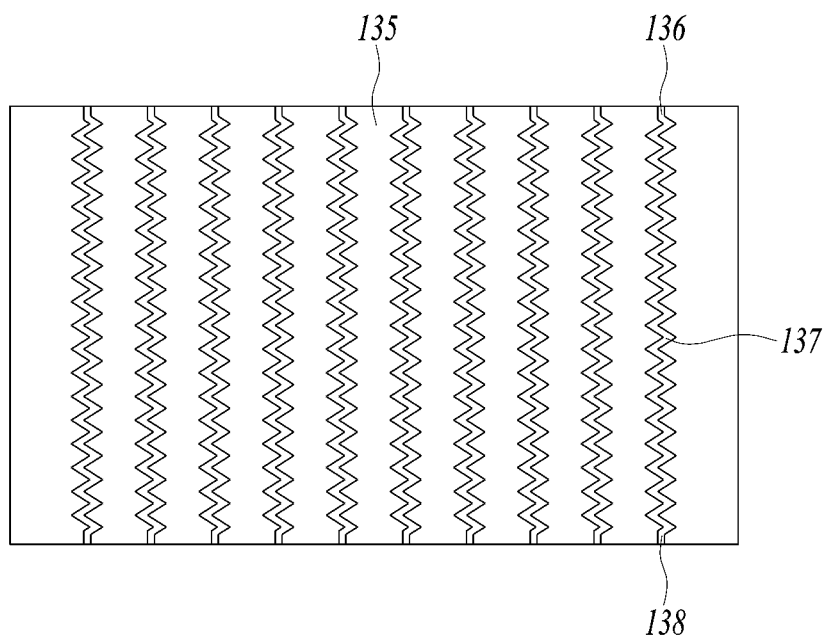

As illustrated in FIGS. 8A and 8B, in the second example of the exemplary embodiment, first channels 132 of each first plate 130 and second channels 137 of each second plate 135 may each be in a zigzag form. A flow path may be lengthened due to the zigzag channel, resulting in an increase in heat exchange efficiency. Each of the plurality of first channels 132 and the plurality of second channels 137 of at least one of the first and second plates 130 and/or 135 includes a zigzag portion.

Figure 9A:
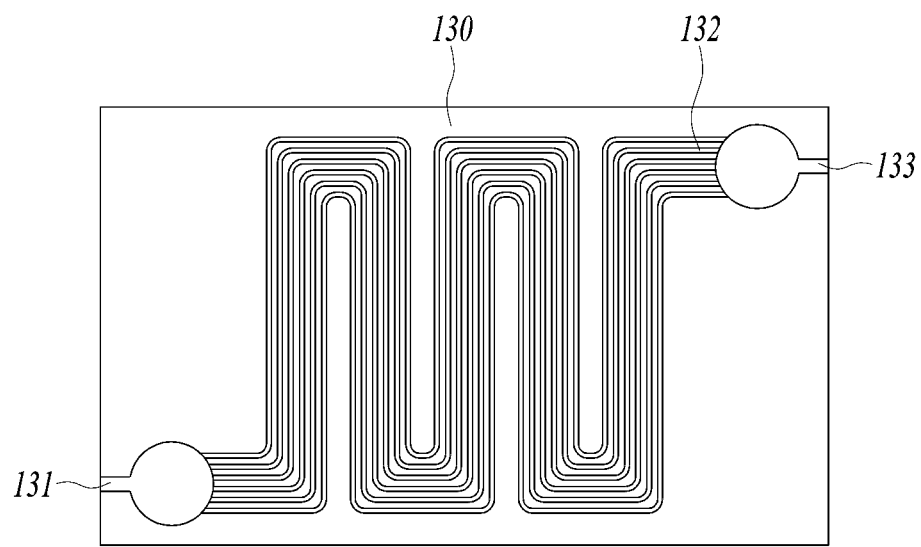
FIGS. 9A and 9B are top views of first and second plates, respectively, formed according to a third example of the exemplary embodiment.
Figure 9B:
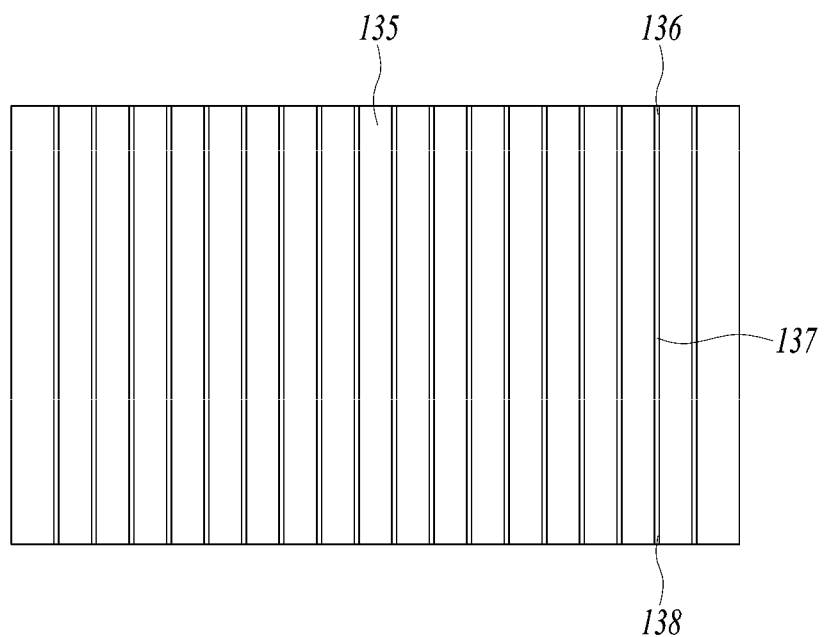

As illustrated in FIGS. 9A and 9B, in the third example of the exemplary embodiment, at least a portion of each first channel 132 of each first plate 130 may be disposed parallel to each associated second channel 137 of each second plate 135. That is, each of the plurality of first channels 132 includes a parallel portion in which one or more of the first channels 132 are disposed in parallel to the plurality of second channels 137.

An inlet 131 for the first channels 132 is positioned at the left end of the first plate and an outlet 133 for the first channels 132 is positioned at the right end of the first plate. The first channels 132 may be connected from the inlet 131 to the outlet 133 after each of the first channels 132 is repeatedly bent and directed upward and then downward. That is, the plurality of first channels 132 of the first plate 130 follow a serpentine path between the inlet 131 of the first channels 132 and the outlet 133 of the first channels 132. Accordingly, coolant and air may flow in parallel in the same or opposite directions through the first and second channels 132 and 137, resulting in an increase in heat exchange efficiency.

Figure 10A:
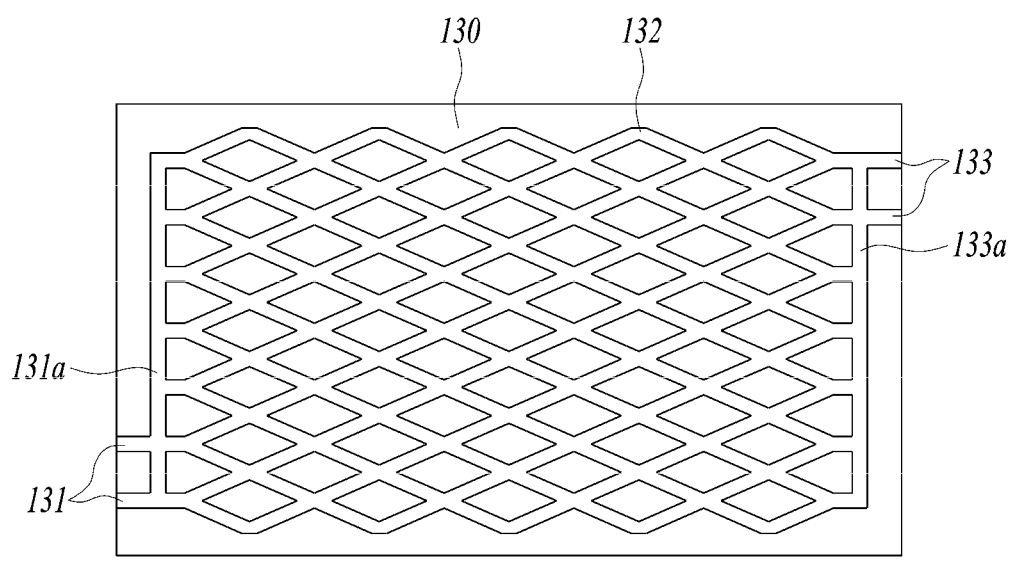
FIGS. 10A and 10B are top views of first and second plates, respectively, formed according to a fourth example of the exemplary embodiment.
Figure 10B:
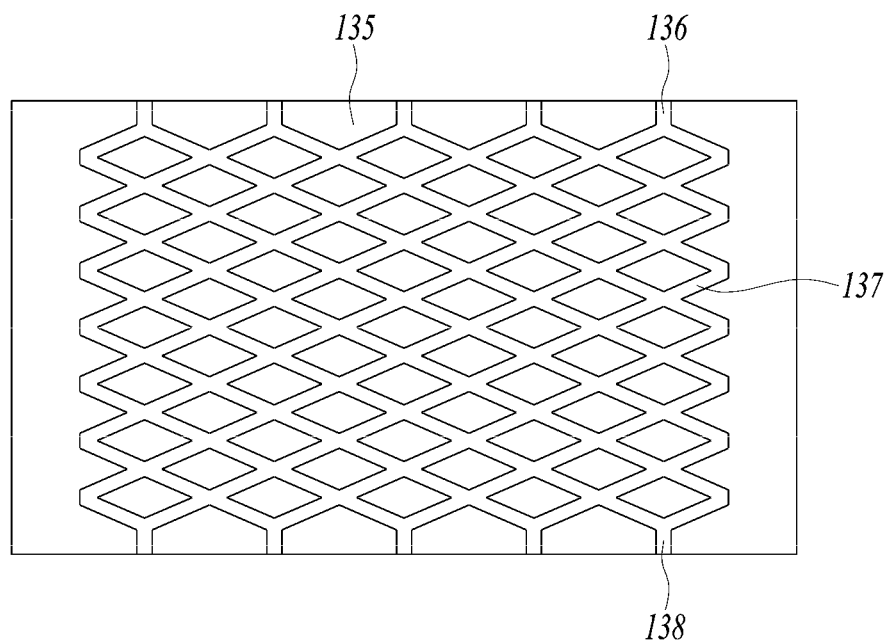

As illustrated in FIGS. 10A and 10B, in the fourth example of the exemplary embodiment, a plurality of first channels 132 of each first plate 130 may include a diamond-shaped mesh portion, and a plurality of second channels 137 of each second plate 135 may likewise include a similar diamond-shaped mesh portion.

Referring to FIG. 10A, two or more inlets 131 may be formed at the lower left of the first plate 130 and may be connected to each other by a connection channel 131a extending to the upper left, and two or more outlets 133 may be formed at the upper right of the first plate 130 and may be connected to each other by a connection channel 133a extending to the lower right. Thus, a pair of connection channels 131a and 133a are formed at opposite ends of the first plate 130. The connection channel 131a is configured to directly connect the inlet ends of the plurality of first channels 132 to each other, and the connection channel 133a is configured to directly connect the outlet ends of the plurality of first channels 132 to each other. Here, the connection channels 131a and 133a are provided in lieu of the bulbous form of the inlets and outlets of the first to third examples of the exemplary embodiment.

Referring to FIG. 10B, a plurality of inlets 136 for the respective second channels 137 may be formed at the upper end of the second plate 135, that is, at a printed board edge portion of the second channels 137. A plurality of outlets 138 for the respective second channels 137 may be formed at the lower end of the second plate 135, that is, at an opposite edge portion of the printed board.

According to the fourth example of the exemplary embodiment, even if specific portions of the diamond-shaped mesh portion of either of the first and second channels 132 and 137 are clogged with foreign substances, a fluid may flow through the other portions of the channels.

Figure 11:
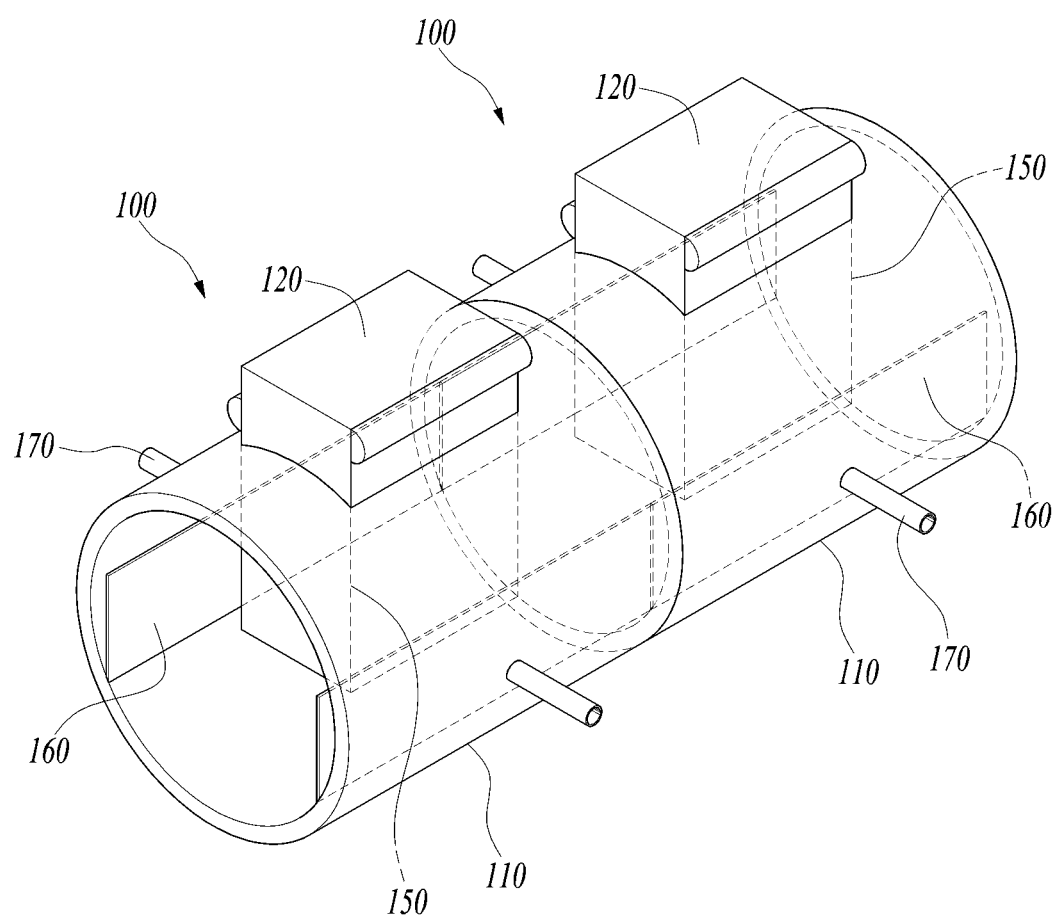
FIG. 11 is a perspective view of a heat exchange apparatus according to another exemplary embodiment.

FIG. 11 illustrates a heat exchange apparatus according to another exemplary embodiment.

As illustrated in FIG. 11, the heat exchange apparatus may include two or more shell housings 110 connected to each other, wherein each of the shell housings 110 is provided with a printed-board-type heat exchanger 120, a flow guide 150, a pair of screen members 160, and a pair of air discharge ports 170.

In general, the gas turbine 1000 requires two or more heat exchangers. In this case, a partition may be provided between the two shell housings 110 for separation of the fluids (air and condensate) to prevent the fluids in the two shell housings 110 from mixing with each other.

As is apparent from the above description, in the heat exchange apparatus and the gas turbine having the same according to the exemplary embodiments, the printed-board-type heat exchanger is provided on the outer surface of the shell housing, in order to cool the air supplied from the combustor to the turbine. Therefore, the heat exchange apparatus and the gas turbine having the same can be sized smaller and the temperature within the shell housing can be kept relatively low due to separation of the heat exchange parts.

Since the heat exchanger is coupled to the outside of the shell housing, there is no need to form a through-hole in the shell housing for coolant injection.

Since the heat exchanger and the shell housing are fastened and assembled by bolts and nuts, the heat exchanger can be easily decoupled and easily cleaned or replaced.

The heat exchange apparatus includes the pair of screen members, the lower ends of which are respectively coupled to opposite sides within the shell housing, and which are positioned at a predetermined distance from both side walls of the shell housing. Therefore, it is possible to prevent the discharged air from containing the condensate collected on the bottom of the shell housing.

In general, the gas turbine requires a plurality of heat exchange apparatuses 100. In this case, the plurality of heat exchange apparatuses can be effectively arranged by interconnecting the respective heat exchange apparatuses.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A heat exchange apparatus comprising:
a shell housing;
a heat exchanger coupled to an outer surface of the shell housing and configured to cool air passing through an air channel of the heat exchanger using a coolant passing through a coolant channel;
a flow guide installed in the shell housing and connected to the air channel of the heat exchanger in order to pass the cooled air into the shell housing, the flow guide having a distal end spaced apart from an inner surface of the shell housing; and
at least one air discharge port installed through a sidewall of the shell housing and configured to communicate with the air channel via the flow guide,
wherein the heat exchanger comprises a first plate and a second plate and is formed by alternately stacking the first and second plates,
wherein the first plate includes a printed board having a plurality of first channels each of which has an open side facing in a plate orientation direction, the plurality of first channels spaced apart from each other in a first direction, and
wherein the second plate includes a printed board having a plurality of second channels each of which has an open side facing in the plate orientation direction, the plurality of second channels spaced apart from each other in a second direction.

2. The heat exchange apparatus according to claim 1, wherein the plurality of first channels of the first plate extend in the second direction between an inlet of the plurality of first channels and an outlet of the plurality of first channels.

3. The heat exchange apparatus according to claim 2, wherein each of the inlet and the outlet of the plurality of first channels communicates with the coolant channel of the heat exchanger via a channel converging portion of the plurality of first channels, the channel converging portion respectively formed on opposite ends of the first plate.

4. The heat exchange apparatus according to claim 1, wherein the plurality of second channels of the second plate extend in the first direction between an inlet of each of the plurality of second channels and an outlet of each of the plurality of second channels, each of the second channel inlets and the second channel outlets Communicating with the air channel of the heat exchanger.

5. The heat exchange apparatus according to claim 4, wherein each of the second channel inlets and the second channel outlets communicates with the air channel of the heat exchanger via a printed board edge portion of the plurality of second channels, the printed board edge portion respectively formed on opposite ends of the second plate.

6. The heat exchange apparatus according to claim 1, wherein the first and second directions are perpendicular to each other.

7. The heat exchange apparatus according to claim 1, wherein the plurality of first channels of the first plate are parallel to each other, and the plurality of second channels of the second plate are parallel to each other.

8. The heat exchange apparatus according to claim 1, wherein each of the plurality of first channels and the plurality of second channels of at least one of the first and second plates includes a zigzag portion.

9. The heat exchange apparatus according to claim 1, wherein the plurality of first channels of the first plate follow a serpentine path between an inlet of the first channels and an outlet of the first channels.

10. The heat exchange apparatus according to claim 9, wherein each of the plurality of first channels of the first plate includes a parallel portion in which one or more of the first channels are disposed in parallel to the plurality of second channels of the second plate.

11. The heat exchange apparatus according to claim 1, wherein each of the plurality of first channels and the plurality of second channels of at least one of the first and second plate includes a diamond-shaped mesh portion.

12. The heat exchange apparatus according to claim 1, wherein the shell housing has a longitudinal center perpendicular to a center of the flow guide.

13. The heat exchange apparatus according to claim 1,
wherein the distal end of the flow guide is disposed at a predetermined height from the inner surface of the shell housing, and
wherein the at least one air discharge port is installed in the sidewall of the shell housing at a position higher than the predetermined height.

14. The heat exchange apparatus according to claim 1, further comprising a pair of screens respectively positioned at a predetermined distance from the sidewall in which the at least one air discharge port is installed, each of the pair of screens having a lower end coupled to an inner surface of the shell housing.

15. The heat exchange apparatus according to claim 14,
wherein the at least one air discharge port includes a pair of air discharge ports installed respectively through opposite sidewalls of the shell housing, and
wherein each of the pair of air disparage ports is disposed behind a corresponding screen of the pair of screens.

16. The heat exchange apparatus according to claim 14, wherein the shell housing consists of two or more shell housings connected to each other, each of the shell housings configured to house the heat exchanger, the flow guide, the at least one discharge port, and the pair of screens.

17. A heat exchange apparatus comprising:
a plurality of shell housings each having an outer surface and a longitudinal axis, the plurality of shell housings connected to each other along the longitudinal axis;
a heat exchanger coupled to the outer surface of each shell housing and configured to cool air passing through an air channel of the heat exchanger using a coolant passing through a coolant channel;
a flow guide installed in each shell housing and connected to the air channel of the heat exchanger in order to pass the cooled air into a corresponding shell housing of the plurality of shell housings, the flow guide having a distal end spaced apart from an inner surface of each shell housing; and
at least one air discharge port installed through a sidewall of each shell housing and configured to communicate with the air channel via the flow guide.

18. A gas turbine comprising:
a compressor configured to compress air;
a combustor configured to produce combustion gas by mixing fuel with the compressed air and burning the mixture;
a turbine configured to generate power by rotating plurality of turbine blades using the combustion gas; and
a heat exchange apparatus configured to cool air supplied from the compressor to the turbine, the heat exchange apparatus comprising:
a shell housing;
a heat exchanger coupled to an outer surface of the shell housing and configured to cool air passing through an air channel of the heat exchanger using a coolant passing through a coolant channel;
a flow guide installed in the shell housing and connected to the air channel of the heat exchanger in order to pass the cooled air into the shell housing, the flow guide having a distal end spaced apart from an inner surface of the shell housing; and
at least one air discharge port installed through a sidewall of the shell housing and configured to communicate with the air channel via the flow guide.

19. The gas turbine according to claim 18, further comprising:
a first cooling air line configured to guide cooling air from a first pressure stage of the compressor to a low-pressure section of the turbine; and
a second cooling air line configured to guide cooling air from a second pressure stage under higher pressure than the first pressure stage of the compressor to a section of the turbine under higher pressure than the low-pressure section,
wherein the heat exchange apparatus is disposed between the first and second cooling air lines.

* * * * *